United States Patent
Ishii

(10) Patent No.: US 8,687,251 B2
(45) Date of Patent: Apr. 1, 2014

(54) IMAGE PROCESSING APPARATUS, IMAGE PROCESSING METHOD, COMPUTER PROGRAM, AND RECORDING MEDIUM

(75) Inventor: Hiroshi Ishii, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 482 days.

(21) Appl. No.: 12/929,275

(22) Filed: Jan. 12, 2011

(65) Prior Publication Data
US 2011/0176152 A1 Jul. 21, 2011

(30) Foreign Application Priority Data
Jan. 21, 2010 (JP) .................................. 2010-010882

(51) Int. Cl.
*G03F 3/08* (2006.01)
*H04N 1/60* (2006.01)
*G06K 9/00* (2006.01)

(52) U.S. Cl.
USPC ............. 358/521; 358/1.9; 358/518; 382/167; 382/165

(58) Field of Classification Search
None
See application file for complete search history.

(56) References Cited

U.S. PATENT DOCUMENTS

| | | | |
|---|---|---|---|
| 5,579,090 A | | 11/1996 | Sasanuma et al. |
| 5,856,876 A | * | 1/1999 | Sasanuma et al. ............ 358/300 |
| 6,184,915 B1 | * | 2/2001 | Atsumi et al. ................ 347/251 |
| 6,278,533 B1 | * | 8/2001 | Takemoto ..................... 358/521 |
| 6,556,707 B1 | | 4/2003 | Yagishita et al. |
| 7,088,472 B1 | | 8/2006 | Okubo et al. |
| 7,499,202 B2 | * | 3/2009 | Ono ............................... 358/518 |
| 7,760,400 B2 | | 7/2010 | Ishii et al. |
| 7,835,032 B2 | * | 11/2010 | Sekine ........................... 358/1.9 |
| 8,049,932 B2 | | 11/2011 | Makino |
| 8,218,989 B2 | * | 7/2012 | Fujita .............................. 399/49 |
| 2004/0246545 A1 | * | 12/2004 | Touura .......................... 358/521 |
| 2004/0257622 A1 | | 12/2004 | Shibaki et al. |
| 2005/0146737 A1 | * | 7/2005 | Ono ............................... 358/1.9 |
| 2006/0077466 A1 | | 4/2006 | Ishii et al. |
| 2007/0127837 A1 | | 6/2007 | Ishii |
| 2009/0034003 A1 | * | 2/2009 | Makino .......................... 358/3.1 |
| 2009/0067860 A1 | * | 3/2009 | Sakai et al. ..................... 399/49 |
| 2010/0118347 A1 | | 5/2010 | Ishii |
| 2010/0271673 A1 | * | 10/2010 | Ohkawa ........................ 358/518 |
| 2010/0309498 A1 | | 12/2010 | Ishii |
| 2011/0222870 A1 | * | 9/2011 | Miyagi ........................... 399/15 |

FOREIGN PATENT DOCUMENTS

| | | |
|---|---|---|
| JP | 07-264427 | 10/1995 |
| JP | 3241986 A | 7/1997 |
| JP | 2005-244801 | 9/2005 |
| JP | 2008-209436 A | 9/2008 |
| JP | 2009-038734 A | 2/2009 |
| JP | 2009-55606 | 3/2009 |

OTHER PUBLICATIONS

Abstract of JP 09-186900 published on Jul. 15, 1997.
Office Action for corresponding Japanese patent application No. 2010-010882 dated Oct. 29, 2013.

* cited by examiner

*Primary Examiner* — Madelein A Nguyen
(74) *Attorney, Agent, or Firm* — Harness, Dickey & Pierce, P.L.C.

(57) ABSTRACT

An optimal interval obtaining sheet is output, and the density thereon is measured using a color meter. A layout determining unit determines an optimal interval at which patches are to be arranged on a sheet including a plurality of patches having the same color and the same gradation based on the measurement.

6 Claims, 13 Drawing Sheets

PATCH 200

PATCH READING VALUE CALCULATING AREA 200a

| PATCH | GRADATION VALUE |
|---|---|
| K00 | 0 |
| K01 | 16 |
| K02 | 32 |
| K03 | 48 |
| K04 | 64 |
| K05 | 80 |
| K06 | 96 |
| K07 | 112 |
| K08 | 128 |
| K09 | 143 |
| K10 | 159 |
| K11 | 175 |
| K12 | 191 |
| K13 | 207 |
| K14 | 223 |
| K15 | 239 |
| K16 | 255 |

| PATCH | GRADATION VALUE | AVERAGES OF ACTUAL MEASUREMENTS OF READING VALUES |
|---|---|---|
| K00 | 0 | 250 |
| K01 | 16 | 207 |
| K02 | 32 | 191 |
| K03 | 48 | 166 |
| K04 | 64 | 141 |
| K05 | 80 | 109 |
| K06 | 96 | 100 |
| K07 | 112 | 88 |
| K08 | 128 | 75 |
| K09 | 143 | 64 |
| K10 | 159 | 51 |
| K11 | 175 | 45 |
| K12 | 191 | 32 |
| K13 | 207 | 29 |
| K14 | 223 | 24 |
| K15 | 239 | 21 |
| K16 | 255 | 20 |

| GRADATION VALUE | TARGET READING VALUE |
|---|---|
| 0 | 250 |
| 17 | 225 |
| 34 | 200 |
| 51 | 175 |
| 68 | 150 |
| 85 | 130 |
| 102 | 110 |
| 119 | 90 |
| 136 | 75 |
| 153 | 60 |
| 170 | 50 |
| 187 | 42 |
| 204 | 35 |
| 221 | 30 |
| 238 | 24 |
| 255 | 20 |

FIG. 10B

| | MAIN 1 SUB 1 | MAIN 2 SUB 1 | MAIN 3 SUB 1 | MAIN 4 SUB 1 | MAIN 1 SUB 2 | MAIN 2 SUB 2 | MAIN 3 SUB 2 | MAIN 4 SUB 2 | MAIN 1 SUB 3 | MAIN 2 SUB 3 | MAIN 3 SUB 3 | MAIN 4 SUB 3 | MAIN 1 SUB 4 | MAIN 2 SUB 4 | MAIN 3 SUB 4 | MAIN 4 SUB 4 |
|---|---|---|---|---|---|---|---|---|---|---|---|---|---|---|---|---|
| MAIN 1 SUB 1 | | | | | | | | | | | | | | | | |
| MAIN 2 SUB 1 | 0.95 | | | | | | | | | | | | | | | |
| MAIN 3 SUB 1 | 0.93 | 0.89 | | | | | | | | | | | | | | |
| MAIN 4 SUB 1 | 0.77 | 0.82 | 0.80 | | | | | | | | | | | | | |
| MAIN 1 SUB 2 | 0.15 | 0.07 | 0.16 | 0.03 | | | | | | | | | | | | |
| MAIN 2 SUB 2 | 0.08 | -0.02 | 0.07 | -0.02 | 0.91 | | | | | | | | | | | |
| MAIN 3 SUB 2 | -0.02 | -0.10 | 0.01 | -0.09 | 0.86 | 0.88 | | | | | | | | | | |
| MAIN 4 SUB 2 | 0.09 | -0.01 | 0.13 | 0.03 | 0.76 | 0.83 | 0.87 | | | | | | | | | |
| MAIN 1 SUB 3 | -0.73 | -0.69 | -0.63 | -0.57 | 0.07 | 0.03 | 0.10 | 0.02 | | | | | | | | |
| MAIN 2 SUB 3 | -0.52 | -0.50 | -0.44 | -0.39 | 0.15 | 0.10 | 0.13 | 0.08 | 0.94 | | | | | | | |
| MAIN 3 SUB 3 | -0.75 | -0.74 | -0.67 | -0.62 | 0.05 | -0.02 | 0.14 | 0.01 | 0.92 | 0.84 | | | | | | |
| MAIN 4 SUB 3 | -0.37 | -0.33 | -0.25 | -0.31 | 0.10 | -0.08 | 0.05 | -0.02 | 0.82 | 0.86 | 0.76 | | | | | |
| MAIN 1 SUB 4 | -0.54 | -0.44 | -0.60 | -0.24 | -0.64 | -0.49 | -0.45 | -0.44 | 0.24 | 0.08 | 0.20 | -0.04 | | | | |
| MAIN 2 SUB 4 | -0.46 | -0.32 | -0.51 | -0.09 | -0.48 | -0.36 | -0.39 | -0.42 | 0.18 | 0.02 | 0.08 | -0.10 | 0.90 | | | |
| MAIN 3 SUB 4 | -0.43 | -0.29 | -0.47 | -0.13 | -0.52 | -0.42 | -0.42 | -0.44 | 0.23 | 0.08 | 0.13 | 0.00 | 0.90 | 0.89 | | |
| MAIN 4 SUB 4 | -0.45 | -0.34 | -0.50 | -0.24 | -0.24 | -0.12 | -0.23 | -0.31 | 0.29 | 0.17 | 0.17 | 0.02 | 0.75 | 0.79 | 0.88 | |

IMAGE PROCESSING APPARATUS, IMAGE PROCESSING METHOD, COMPUTER PROGRAM, AND RECORDING MEDIUM

CROSS-REFERENCE TO RELATED APPLICATIONS

The present application claims priority to and incorporates by reference the entire contents of Japanese Patent Application No. 2010-010882 filed in Japan on Jan. 21, 2010.

BACKGROUND OF THE INVENTION

1. Field of the Invention

The present invention relates to an image processing apparatus, an image processing method, a computer program, and a recording medium for allowing gradation characteristics of an image output apparatus to be gripped in a digital copying machine, a facsimile, a printer, and the like that form a gradation image, and for allowing gradation correction parameters suitable for the gradation characteristics of the image output apparatus to be generated.

2. Description of the Related Art

In an image output apparatus, even if the same image data is output, the density may change over time. Therefore, to suppress the density fluctuation occurring over time, a conventional image output apparatus has been designed to output predetermined patches, and a scanner or the like is used to read the patches to get a grip on gradation characteristics of the image output apparatus at that time and to generate gradation correction parameters.

However, an image output apparatus may output the same image data in different densities depending on the position of an image. In an electrophotographic image output apparatus, for example, such a change could occur due to the member quality or the precision of an assembly, such as eccentricity of a photosensitive element or a transfer roller, or a fluctuation in the space between the photosensitive element and a developing sleeve at a position along the direction of the rotating shaft of the photosensitive element.

In response to this issue, Japanese Patent Application Laid-open No. 2008-209436 and Japanese Patent Application Laid-open No. 2009-38734 suggest apparatuses that generate a plurality of patches having the same density and the same gradation value, measure the density values of the patches, and take an average of the measured density values to generate gradation correction parameters for suppressing the effect of the density fluctuation occurring depending on positions of images, while generating density correction parameters for suppressing a density fluctuation occurring over time as well.

For example, according to the disclosure in Japanese Patent Application Laid-open No. 2008-209436, an image forming system arranges a plurality of color measurement patterns in a direction in which the fluctuation of printing characteristics is expected to be large. Furthermore, as a method for determining a chart for suppressing the effect of in-plane unevenness by outputting repetitive patterns and obtaining the average of patches of, the same color, Japanese Patent Application Laid-open No. 2009-38734 discloses a method for selecting a pattern to be output by which the colors of patches included in a patch chart, i.e., an arrangement of patches of the same colors, are measured, the measurements are averaged as a reference value, and a repetitive pattern closest to the reference value is selected.

In generating gradation correction parameters, a precision degradation resulting from the in-plane unevenness caused by an image output apparatus may be suppressed by arranging the same patches at different positions, as disclosed in Japanese Patent Application Laid-open No. 2008-209436 and Japanese Patent Application Laid-open No. 2009-38734.

However, the technology disclosed in Japanese Patent Application Laid-open No. 2008-209436 takes the direction in which the patterns are positioned with respect each other into consideration, but does not take the distance between the patterns into consideration. Thus, the effect of the density fluctuation caused by an image output apparatus may not be suppressed sufficiently. Furthermore, in the technology according to Japanese Patent Application Laid-open No. 2009-38734, the average of the measurements of the patches arranged at different positions is used as a reference. However, when an average is used as a reference, it may not be always possible to obtain a repetitive pattern suitable for suppressing the effect of the in-plane unevenness for the following reasons.

For example, if the main cause of the density fluctuation is eccentricity of the photosensitive element, the cycle of the density fluctuation along the rotating direction of the photosensitive element is largely dependent on the circumferential length of the photosensitive element. To generate proper gradation correction parameters, it is necessary to suppress the effect of density unevenness resulting from the periodic component. For example, assuming that the density fluctuation is a sine-wave fluctuation with reference to zero density in the cycle of the circumferential length of the photosensitive element, the zero density must be identified highly precisely.

Assuming that five patches are output at equally spaced five points A to E on a piece of paper and an average density is calculated based on the points A to E, and the circumferential length of the photosensitive element is equal to the distance between A and E as illustrated in FIG. 8A, the densities at the certain phase angle of the photosensitive element corresponding to the positions A and E affect the average density largely. In other words, as illustrated in FIG. 8B, the average density (dotted line) of the five points, which are the average of the densities a to e of the patches arranged at A to E, is generally not the same as the zero density.

SUMMARY OF THE INVENTION

It is an object of the present invention to at least partially solve the problems in the conventional technology.

According to an aspect of the present invention, an image processing apparatus comprises: an image output unit that causes an image output apparatus to output a gradation correction parameter generating sheet; and a gradation characteristics obtaining unit that obtains gradation characteristics of the image output apparatus based on the gradation correction parameter generating sheet thus output, and the gradation correction parameter generating sheet includes a plurality of patches having a same color and a same gradation, and the patches are arranged so as to be in a positional relationship that makes a correlation between densities of the patches output by the image output apparatus smallest.

According to another aspect of the present invention, an image processing apparatus comprises: an image output unit that causes an image output apparatus to output a gradation correction parameter generating sheet; and a gradation characteristics obtaining unit that obtains gradation characteristics of the image output apparatus based on the gradation correction parameter generating sheet thus output, and the gradation correction parameter generating sheet includes two patches having a same color and a same gradation, and the two patches are arranged at a minimum correlation interval that is an interval at which a correlation coefficient between densities of the two patches output from the image output apparatus is near a minimum value.

According to still another aspect of the present invention an image processing apparatus comprises: an image output unit that causes an image output apparatus to output a gradation correction parameter generating sheet; and a gradation characteristics obtaining unit that obtains gradation characteristics of the image output apparatus based on the gradation correction parameter generating sheet thus output, and the gradation correction parameter generating sheet includes two patches having a same color and a same gradation, and the two patches are arranged at a minimum correlation interval that is an interval at which a correlation coefficient between densities of the two patches output from the image output apparatus is near a minimum value along a paper conveying direction of the image output apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10B is a table of 120 correlation coefficients;

DETAILED DESCRIPTION OF THE PREFERRED EMBODIMENTS

An exemplary embodiment according to the present invention is described below in greater detail with reference to some drawings.

Figure 1:
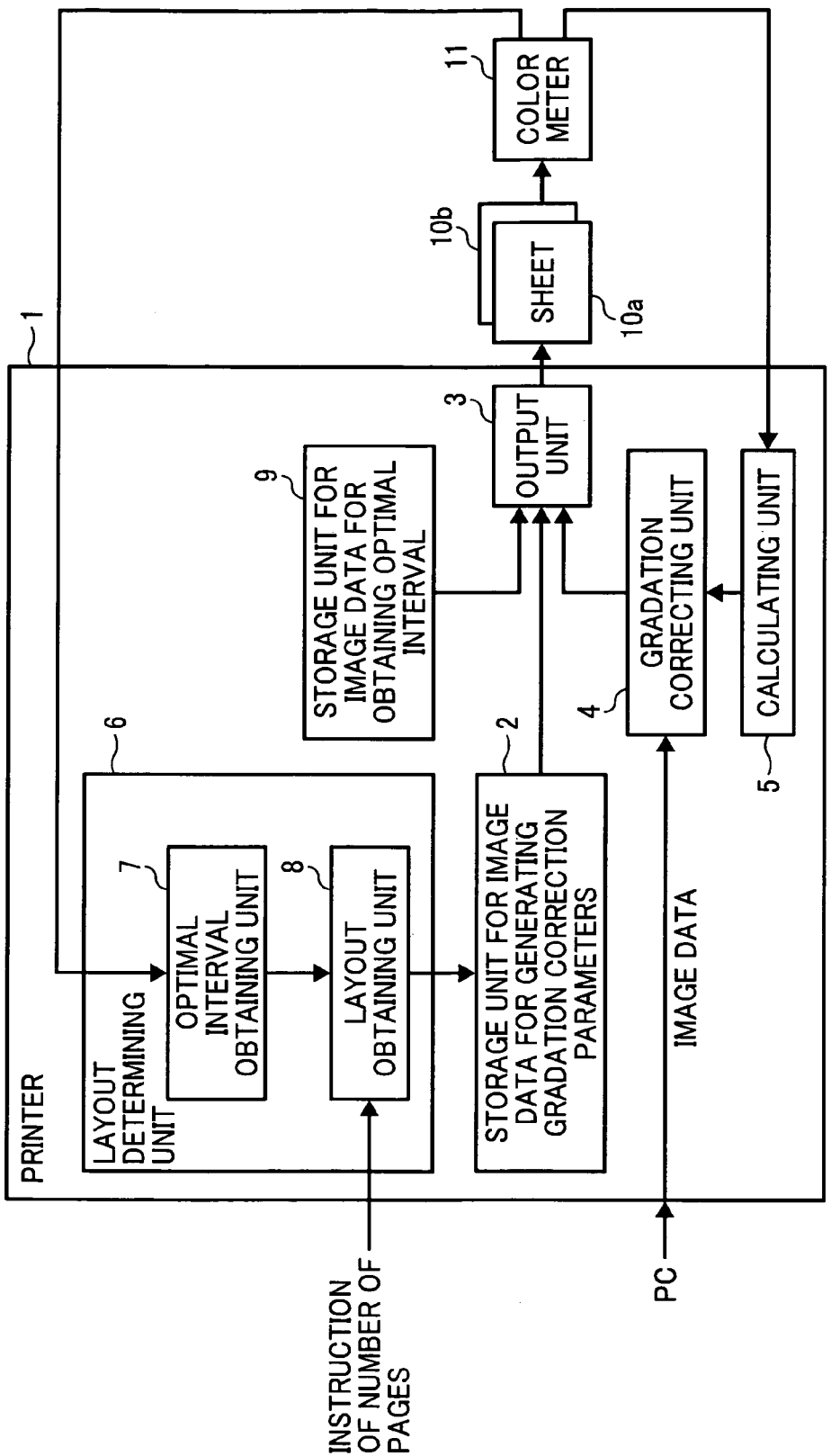
FIG. 1 is a schematic of a configuration according to an embodiment of the present invention.

FIG. 1 is a schematic of a configuration according to an embodiment of the present invention. In FIG. 1: the reference numeral 1 denotes a printer (image output apparatus); the reference numeral 2 denotes a storage unit storing therein image data used for generating gradation correction parameters; the reference numeral 3 denotes an output unit including a photosensitive element and the like; the reference numeral 4 denotes a gradation correcting unit that corrects a gradation of image data received from a personal computer (PC) or the like using a γ correction table; the reference numeral 5 denotes a calculating unit that generates the γ correction table based on values read from patches; the reference numeral 6 denotes a layout determining unit including an optimal interval obtaining unit 7 and a layout obtaining unit 8; reading a sheet 10b output with image data for obtaining an optimal interval; and determining the optimal interval at which the patches are arranged on a gradation correction parameter generating sheet 10a so that the patches fit into an instructed number of pages; the reference numeral 9 denotes a storage unit storing therein the image data for obtaining the optimal interval, the reference numerals 10a and 10b denote the gradation correction parameter generating sheet and the optimal interval obtaining sheet, respectively; and the reference numeral 11 denotes a color meter such as a scanner that reads the patches printed on the sheets 10a and 10b.

In the following explanation, it is assumed that gradation value, that is, image data is expressed in an integer between zero and 255. A larger value indicates a higher density. On the contrary, in scanner data and a reading value of the scanner, a smaller value indicates a higher density.

Figure 2:
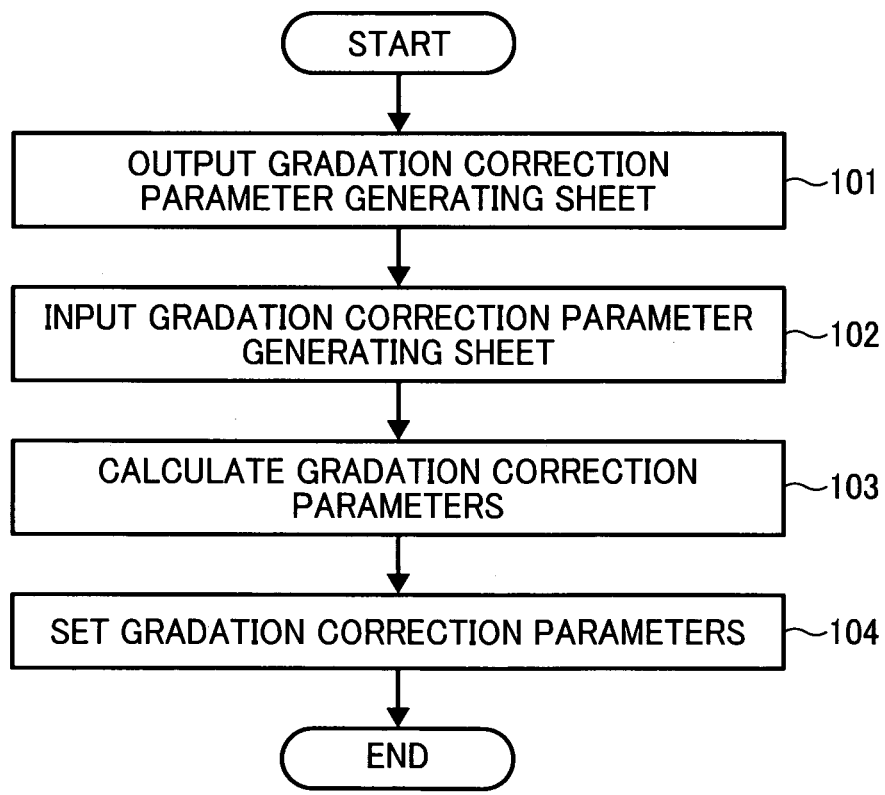
FIG. 2 is a flowchart of a process of generating gradation correction parameters according to the present invention.

FIG. 2 is a flowchart of a process of generating gradation correction parameters according to the present invention.

Figure 3:
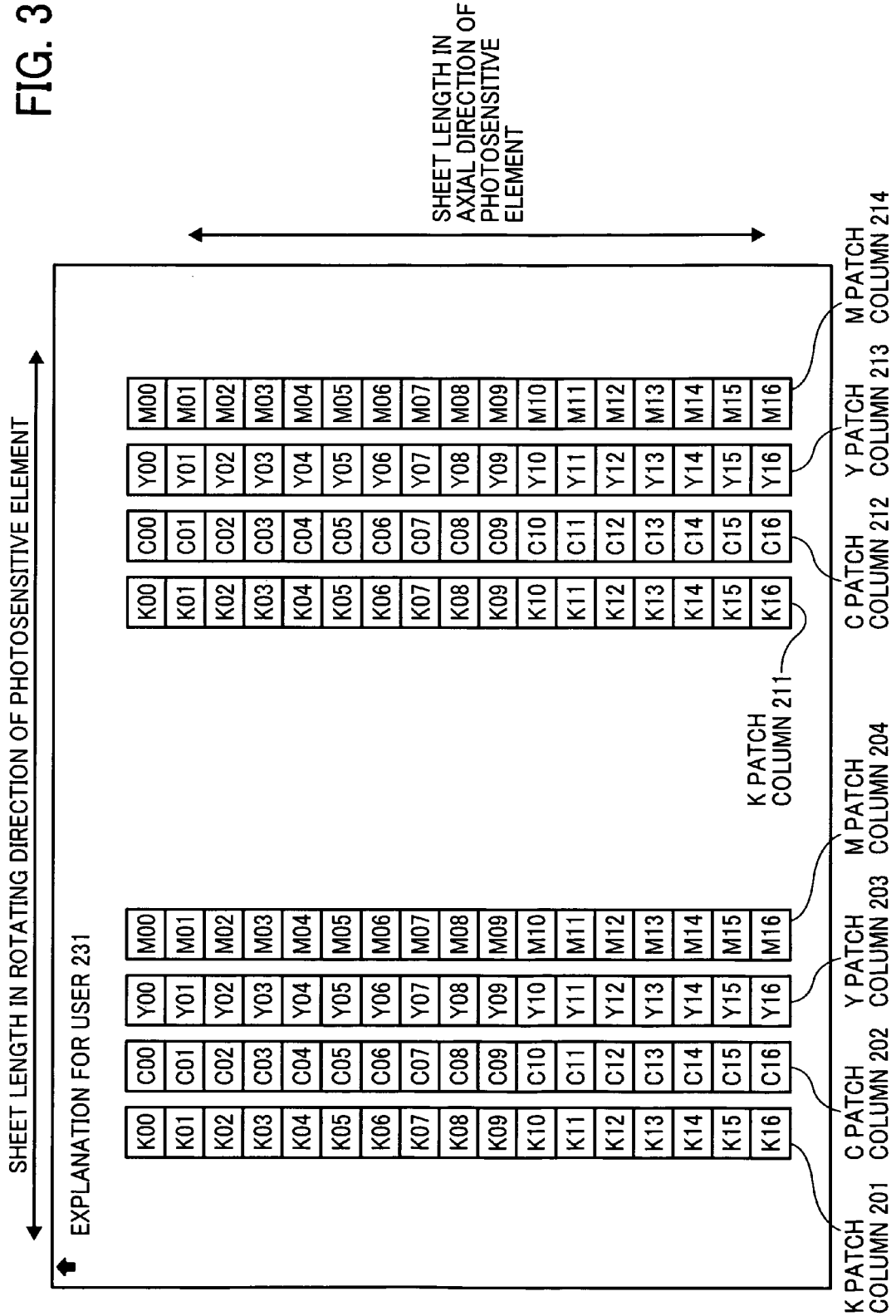
FIG. 3 is a schematic of a gradation correction parameter generating sheet.

At Step 101 of outputting the gradation correction parameter generating sheet, the output unit 3 receives an input of image data used for generating the gradation correction parameters; appends a patch column K201, a patch column C202, a patch column Y203, a patch column M204, and a patch column K211, a patch column C212, a patch column Y213, a patch column M214, and an explanation 231 for a user to the image data; and outputs the gradation correction parameter generating sheet 10a illustrated in FIG. 3 in a manner so that the patch column K201 is located at the leading edge in the rotating direction of the photosensitive element.

In this example, K denotes the black color, C denotes the cyan color, Y denotes the yellow color, and M denotes the magenta color. Each one of these colors is expressed in a single color of the image output apparatus, in other words, expressed using a single color material.

Figures 4A, 4B, 4C, 4D:
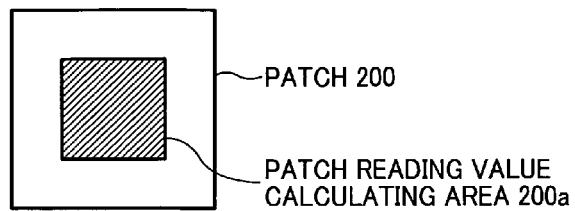
FIG. 4A is a table of gradation values of K patches.
FIG. 4B is a schematic for explaining how the reading value is calculated for each of the patches.
FIG. 4C is a table of averages of actual measurements of reading values.
FIG. 4D is a table of target reading values.

FIG. 3 is a schematic of the gradation correction parameter generating sheet. Each of the patch column K201 and the patch column K211 includes patches from a patch K00 to a patch K16. The gradation value of the patch K00 is set to zero, the gradation value of the patch K16 is set to 255, and the K gradation values are given so that the gradation values increase almost evenly from the patch K01 to the patch K15 as illustrated in FIG. 4A. The C, M, and Y gradation values are all set to zero.

The gradation values of the patch K00 to the patch K16 do not necessarily have to increase almost evenly, and for example, the gradation values may be kept to increase at a small step while the gradation values are small, and the gradation values may be increased at a large step as the gradation values increase. An important point is that the gradation values of the patch Kn (0≤n≤16) in the patch column K201 and those in the patch column K211 are the same. The patch column K201 and the patch column K211 are arranged at an optimal interval d determined by a process to be described later.

Similarly, each of the patch columns C202 and the patch column C212, for example, includes patches from a patch C00 to a patch C16. The gradation value of the patch C00 is set to zero, the gradation value of the patch C16 is set to 255, and the C gradation values are given so that the gradation values increase almost evenly from the patch C01 to the patch C15. The K, M, and Y gradation values are all set to zero.

At this time, the space between the patch columns, for example, the patch column K201 and the patch column C202, may be either reserved or omitted. Furthermore, in each of the patch columns, for example, in the patch column K201, the space between the patch K08 and the patch K09 may be either reserved or omitted.

The gradation correction parameter generating sheet illustrated in FIG. 3 may be a sheet output after a gradation correcting process is applied using, the gradation correction parameters previously generated by the image output apparatus, instead of a sheet on which the given gradation values are output as they are.

At Step 102 of receiving an input of the gradation correction parameter generating sheet, the color meter (scanner) 11 reads the gradation correction parameter generating sheet 10a set by a user, and calculates a reading value for each of the patches.

FIG. 4B is a schematic for explaining how the reading value is calculated for each of the patches. The color meter (scanner) 11 reads the gradation correction parameter generating sheet 10a, and obtains the reading value for each of the patches in the manner described below.

For the K patch and the Y patch, the scanner obtains the average of data in the green channel read from 128×128 pixels located in the patch as a reading value of the patch. For the C patch, the scanner obtains the average of data in the red channel read from the 128×128 pixels located in the patch as a reading value of the patch. For the M patch, the scanner obtains the average of data in the blue channel read from the 128×128 pixels located in the patch as a reading value of the patch. At this time, the scanner selects a channel in which scanner data changes in the widest range for each of colors of the patches.

As illustrated in FIG. 4B, the scanner obtains the average value of the scanner data in a given channel read from a patch reading value calculating target area 200a having the size mentioned above as a reading value of a patch 200.

At Step 103 of calculating the gradation correction parameters, the calculating unit 5 calculates the gradation correction parameters. A method for calculating the gradation correction parameters will now be explained with reference to FIGS. 4C and 4D. The patches output in the same color and in the same gradation value are present at two locations. For example, both of the patch K08 in the patch column K201 and the patch K08 in the patch column K211 are in black, and have a gradation value of 128 as depicted in FIG. 4A. A reading value has been calculated for each of these patches at Step 102.

Therefore, the average of the reading value of the patch K08 in the patch column K201 and the reading value of the patch K08 in the patch column K211 is used as the reading value of the black color in the gradation value 128 corresponding to the patches K08. For example, assuming that the reading value of the former is 80 and the reading value of the latter is 70, the reading value of the black in the gradation value 128 will be 75, which is the average of the two. In this manner, the calculating unit 5 obtains the averages of actual measurements of the reading values as depicted in FIG. 4C. At this time, if three or more patches in the same color and having the same gradation value are present on the gradation correction parameter generating sheet, an average of all of these reading values may be used.

The γ correction table, which is the gradation correction parameters, is generated so as to satisfy a relationship between a predetermined target gradation value and the reading value of the patch.

FIG. 4D depicts the relationship between target gradation values and reading values. This relationship indicates that, when the image output apparatus is instructed to output a patch in a gradation value of 136, for example, the output is expected to be in the density read by the scanner at a reading value of 75, and the γ correction table may be generated so that such a density characteristic is obtained.

Figure 5A:
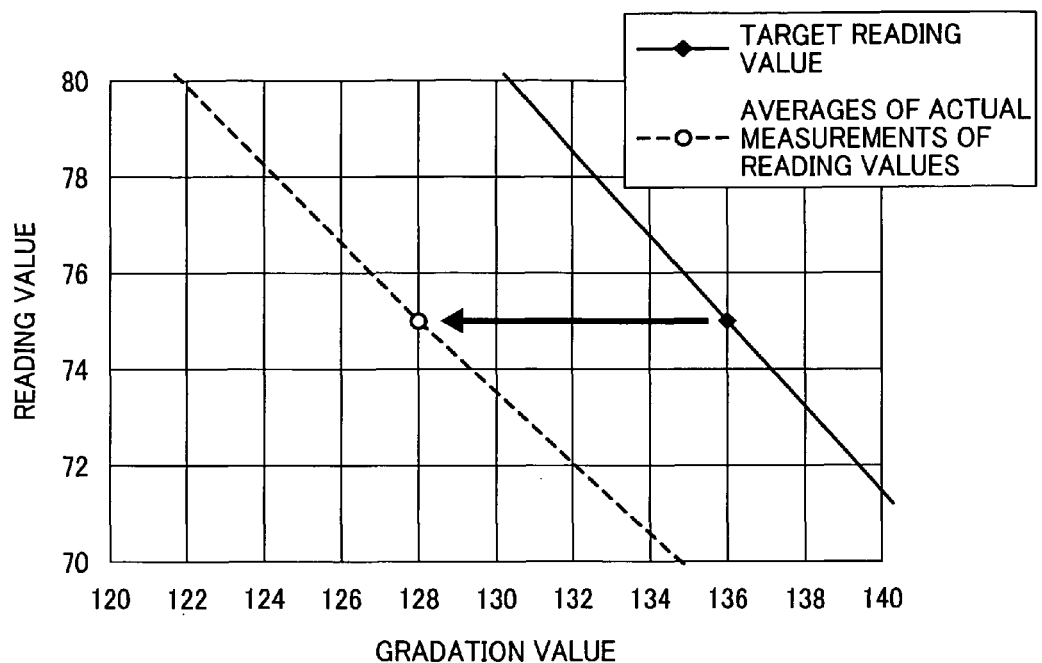
FIGS. 5A and 5B are generated γ correction tables.

As illustrated in FIG. 4D, if a reading value of 75 is given to the gradation value 136 as a target and a black patch in the gradation value 128 results in a reading value of 75 as depicted in FIG. 4C, the calculating unit 5 generates the γ correction table so that an output is made in the gradation value 128 in response to an input of the gradation value 136 (FIG. 5A).

In other words, in the gradation correcting process, the black data having the gradation value 136 is converted into black data having the gradation value 128 and outputted. In an output result of the gradation correction parameter generating sheet illustrated in FIG. 3, because the reading value corresponding to a patch output in the black color and the gradation value 128 is 75 as depicted in FIG. 4C, by performing the gradation correcting process using the γ correction table thus generated, the output is expected to be in the manner as specified in the target where the reading value 75 is obtained for the gradation value 136.

When a target of a reading value of 30 is given to the gradation value 221 as depicted in FIG. 4D, there is no patch having a reading value of 30 as depicted in FIG. 4C. In such a case, a linear interpolation is performed to calculate the gradation value corresponding to the reading value 30.

Figure 5B:
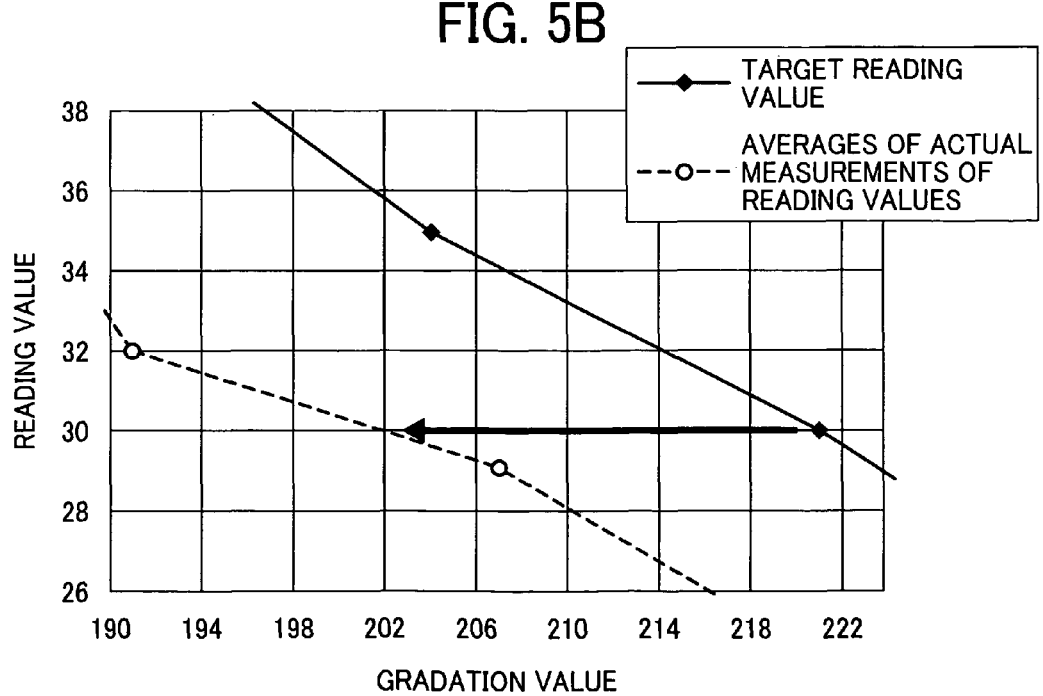

Based on FIG. 4C, because the reading value of the patch K12, which is the black patch having a gradation value of 191, is 32 and the reading value of the patch K13, which is the black patch having a gradation value of 207, is 29, the gradation value corresponding to the reading value 30 is considered to be 202 from the calculation (207−191)÷(29−32)×(30−32)+191≈201.66 rounded off (FIG. 5B).

After generating the γ correction table depicted in FIG. 4D for the gradation values of the discrete 16 points in the manner explained above, the 16 points are corrected by performing a spline interpolation to make these points smooth and not to be reversed if it is necessary. In this manner, the γ correction table specifying an output gradation value corresponding to an input gradation value for every single digit of the gradation values between zero and 255 is generated.

In the embodiment explained above, the output patches are read by the scanner. In other words, the scanner is used, for obtaining the gradation characteristics, as a substitute for a color meter such as a density meter or an intensity meter. Therefore, in the embodiment, the density or the intensity of an image that the user would like to achieve in outputting a certain gradation value is converted into a reading value of the scanner in advance to obtain the relationship between a gradation value and a reading values depicted in FIG. 4D as a target.

This exemplary embodiment allows the gradation characteristics to be obtained without requiring a separate color meter, because a copying machine, for example, already has a scanner for inputting an image as well as a printer for outputting an image. However, instead of the scanner, a color meter such as a density meter or an intensity meter for obtaining the gradation characteristics may be used for a copying machine as well. In such a configuration, the γ correction table is generated using targets represented as a relationship between each of the gradation values and a density or intensity, instead of the targets represented as a relationship between each of the gradation values and a corresponding reading value of the scanner depicted in FIG. 4D. The value of each of the patches read by the scanner may also be nonlinearly converted into a density and the like before obtaining the average, and the targets may be specified in converted values as well.

At Step 104 of setting the gradation correction parameters, the gradation correcting unit 4 in the printer 1 is set such that the gradation correction parameters (γ correction table) 5 are used in the gradation correction processing.

Figure 6A:
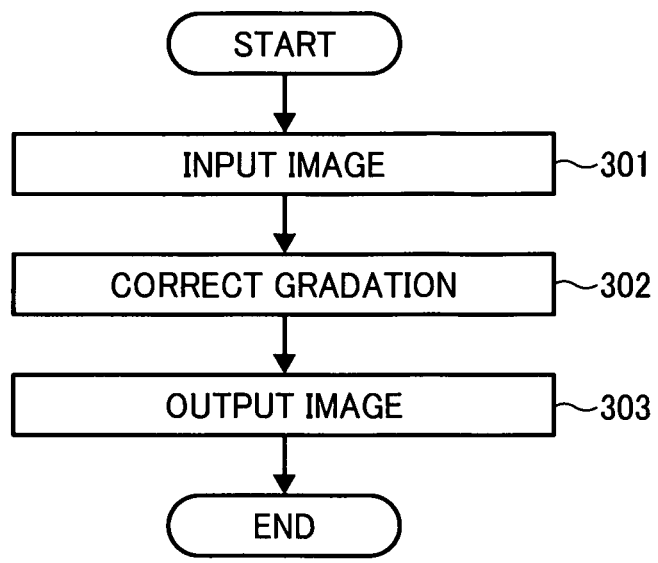
FIG. 6A is a flowchart of a gradation correcting process.

FIG. 6A is a flowchart of the gradation correcting process performed using the γ correction table that is the gradation correction parameters generated in the manner explained above.

At Step 301 of inputting an image, image data including pixels and each of the pixels having an integer between zero and 255 and received from the PC is sequentially input to the gradation correcting unit 4 included in the printer 1, one pixel at a time. At Step 302 of correcting the gradation, the gradation correcting unit 4 converts the gradation values of the received image according to the γ correction table, one pixel at a time. At Step 303 of outputting the image, the output unit 3 outputs the gradation values thus converted, one pixel at a time.

Figure 6B:
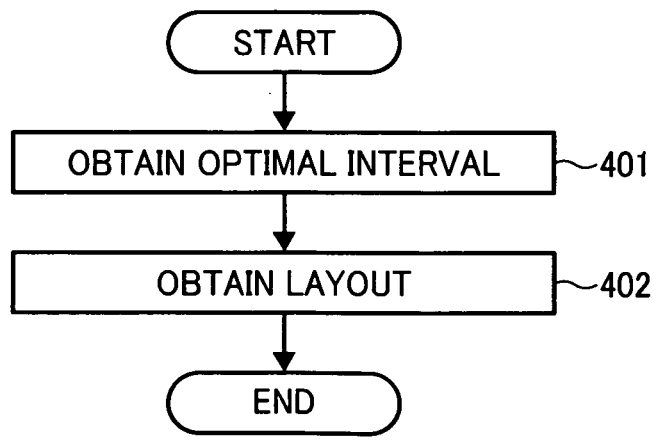
FIG. 6B is a flowchart of a layout determining process.

FIG. 6B is a flowchart of creating image data used for generating the gradation correction parameters, that is, a flowchart of the process of determining the layout for the patch arrangement.

Figure 7:
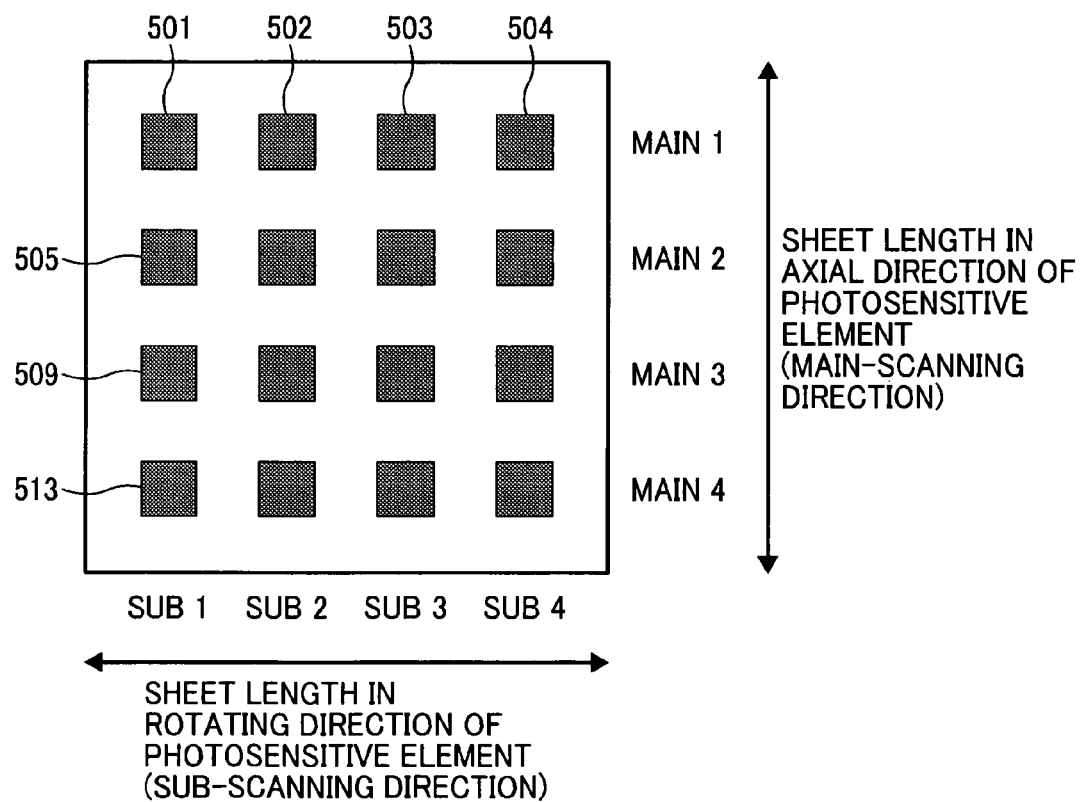
FIG. 7 is a schematic of an image pattern used for obtaining an optimal interval.

To determine the layout, at Step 401 of obtaining the optimal interval, the output unit 3 outputs an optimal interval obtaining image pattern illustrated in FIG. 7 and read from the storage unit 9 onto a sheet 10b. The color meter (density meter) 11 then measures the densities of the patches on the optimal interval deriving sheet 10b, and the optimal interval obtaining unit 7 obtains the relationship between the position and the density of the patch to derive the optimal interval.

In other words, the pattern illustrated in FIG. 7 is output over a plurality of pages, the transition of the density of each of the patches is obtained, and a correlation coefficient between the densities of two patches is calculated. The positional relationship of a pair of patches having the smallest correlation coefficient is then used as the optimal interval.

Figure 8A:
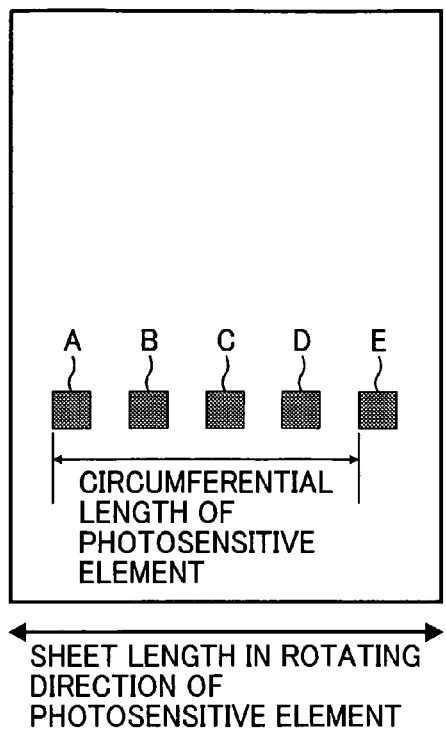
FIG. 8A is a schematic for explaining positions of five patches arranged in the rotating direction of a photosensitive element.
Figure 8B:
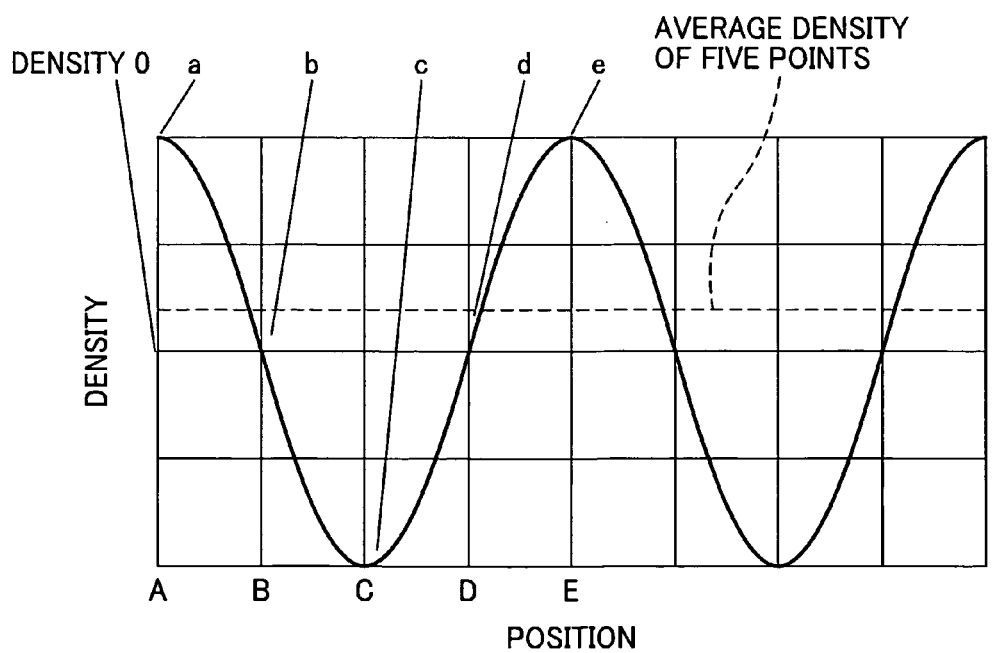
FIG. 8B is a graph of a relationship between the positions of the five patches illustrated in FIG. 8A and the densities of the patches.
Figure 9:
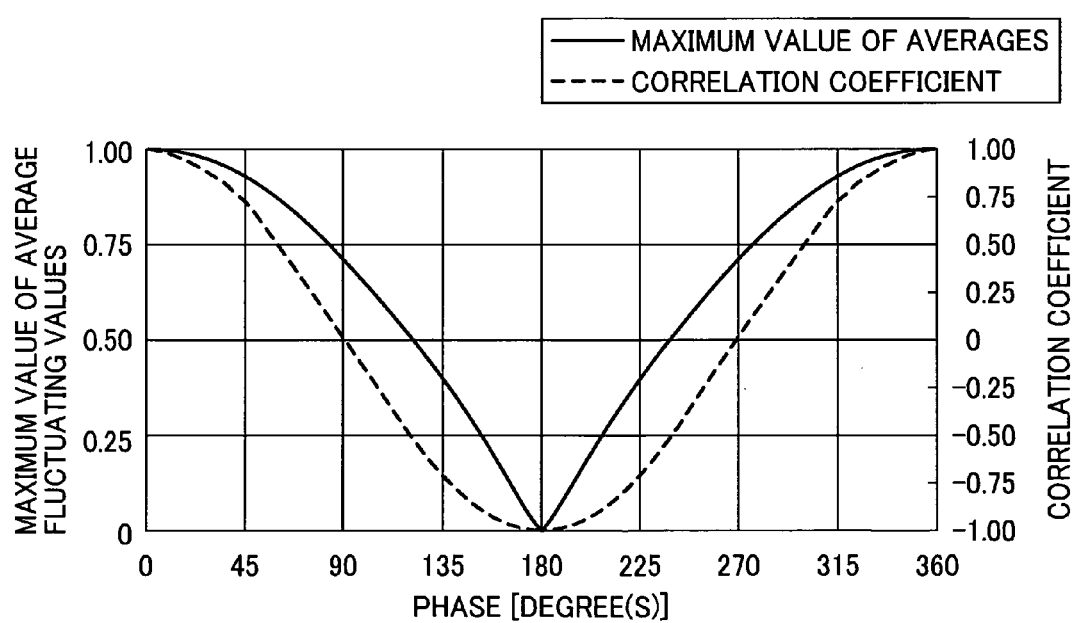
FIG. 9 is a schematic for depicting a relationship between the phase difference between two points illustrated in FIG. 8B and the maximum value of the average densities of the two points having the phase difference in a solid line.

The reason why the pair with the smallest correlation coefficient is used as the optimal interval will now be explained. For example, it is assumed that there is a relationship between the patch positions as illustrated in FIG. 8A and the densities of the five points (A to E) as illustrated in FIG. 8B. A to E is considered one cycle, that is, the phase difference between A and E is 360 degrees. In FIG. 9, a relationship between a phase difference between two points and the maximum value in the averages of the densities of two points having such a phase difference is depicted in a solid line. A relationship between a phase difference between two points and the correlation coefficient is depicted in a dotted line. Based on FIG. 9, it can be understood that, as the correlation coefficient becomes smaller, the average density moves closer to zero. In other words, it can be expected that a value closer to the zero density may be obtained by taking the average.

The correlation coefficient herein is a calculation of a correlation between the densities of two points having a fixed phase difference. For example, two points having a phase difference of 180 degrees include the point A and the point C, and the point B and the point D illustrated in FIGS. 8A and 8B. The correlation coefficient at a phase difference of 180 degrees is a correlation coefficient calculated for the densities of different two points with a phase difference of 180 degrees, including the pairs mentioned above.

FIG. 7 depicts a pattern that includes K-color patches having a gradation value of 170 and a size of 15 millimeters square, and arranged at four locations at a 40-millimeter interval along the rotating direction of the photosensitive element and at four locations at a 40-millimeter interval along the axial direction of the photosensitive element. This pattern is output so that a patch 501, a patch 505, and the like are to be located at the leading edge of the paper. Hereinafter, the rotating direction of the photosensitive element is defined as a sub-scanning direction, and the axial direction of the photosensitive element is defined as a main-scanning direction; and the position of the patch 502 is referred to as main 1-sub 2, and the position of the patch 509 is referred to as main 3-sub 1, and so on.

In the embodiment, a patch in color K and in the gradation value 170 is used because they are the color and the gradation value whose change can be visually recognized easily. However, as long as the patches in the same color and the same value are arranged, any other colors or any other gradation values may be used.

Figure 10A:
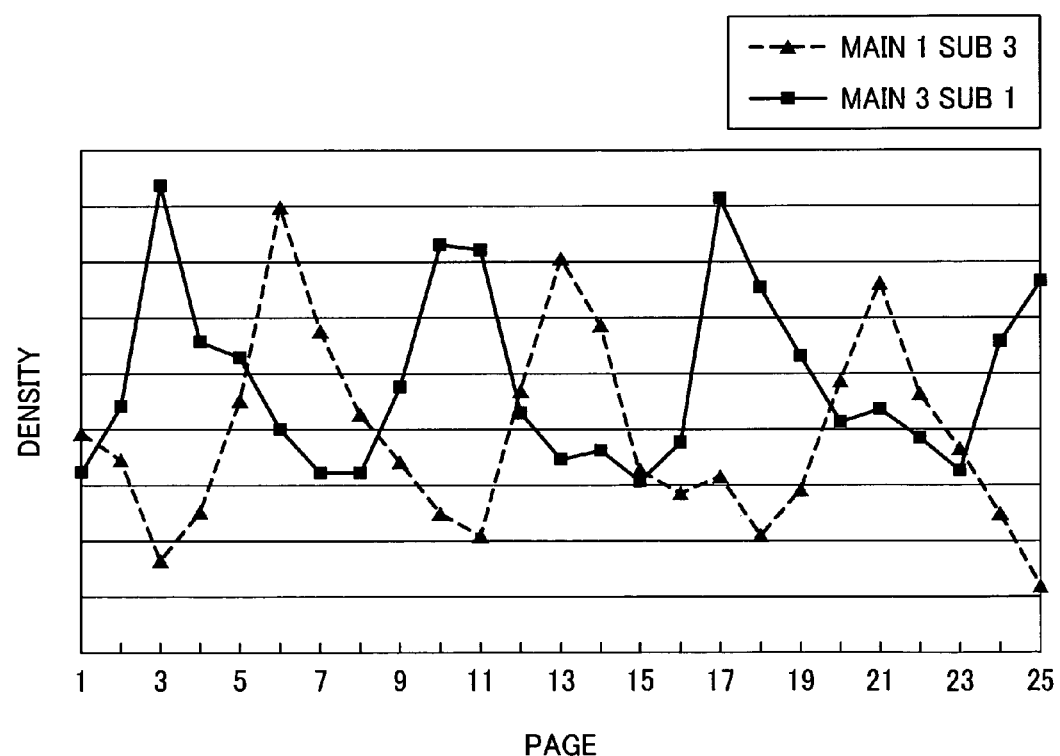
FIG. 10A is a graph of transitions of densities of main 1-sub 3 and main 3-sub 1 over 25 pages.

FIG. 10A depicts the transitions of the densities of the main 1-sub 3 and the main 3-sub 1 over 25 pages when the pattern illustrated in FIG. 7 is output from the image output apparatus continuously for 25 pages. It can be seen that, when one is dark, the other tends to be light.

FIG. 10B depicts a calculation result of a correlation coefficient between the density of a patch at a certain position and the density of the patch at another position over the 25 pages, the correlation coefficient being calculated after the pattern illustrated in FIG. 7 is output from the image output apparatus continuously for 25 pages and the densities are measured using the density meter. The correlation coefficient is calculated as a value between −1 and 1. When the correlation coefficient is closer to 1, one tends to be dark when the other is dark as well. On the contrary, when the correlation coefficient is closer to −1, one tends to be light when the other is dark. When the correlation coefficient is closer to zero, the correlation between the two is weak. For example, the correlation coefficient between the main 1-sub 1 and the main 1-sub 3 is −0.63, which indicates the tendency that, when one is dark, the other is light.

In FIG. 10B, the pair of patches having the smallest correlation coefficient amongst those arranged at the same position in the main-scanning direction is the pair of the main 1-sub 1 and the main 1-sub 3. Therefore, the interval between these two patches, that is, a distance of 80 millimeters corresponding to these two patches in the sub-scanning direction is used as the optimal interval.

In this example, because the density fluctuation tends to occur periodically in the rotating direction of the photosensitive element, which is the sub-scanning direction, because of eccentricity of the rotating body such as the photosensitive element, the interval between the pair having the smallest correlation coefficient amongst those arranged at the same position in the main-scanning direction is used as the optimal interval. Alternatively, the interval between the pair of the main 1-sub 1 and the main 3-sub 3 having the smallest correlation coefficient, as depicted in FIG. 10B, that is, a distance of 80 millimeters corresponding to two patches in the main-scanning direction and a distance of 80 millimeters corresponding to two patches in the sub-scanning direction may be used as the optimal interval.

Furthermore, according to the embodiment, two patches having the same color and the same gradation are arranged. However, if three patches are used instead of two patches, for example, a triplet of patches having the smallest average of the correlation coefficient between three patches is obtained from FIG. 10B. In such an example, because the triplet of the main 1-sub 1, the main 3-sub 3, and the main 2-sub 4 has the smallest average of −0.38, the interval between the three should be used as the optimal interval.

Information of the optimal interval is maintained in the optimal interval obtaining unit 7 so as to allow the layout obtaining unit 8 to refer to the information at any time.

To determine the layout, at Step 402 of obtaining the layout, the layout obtaining unit 8 obtains a layout of a patch arrangement. To begin with, the layout obtaining unit 8 checks if the patch columns can be arranged in the order of KCYMKCYM sequentially from the leading edge along the rotating direction of the photosensitive element.

Figure 11:
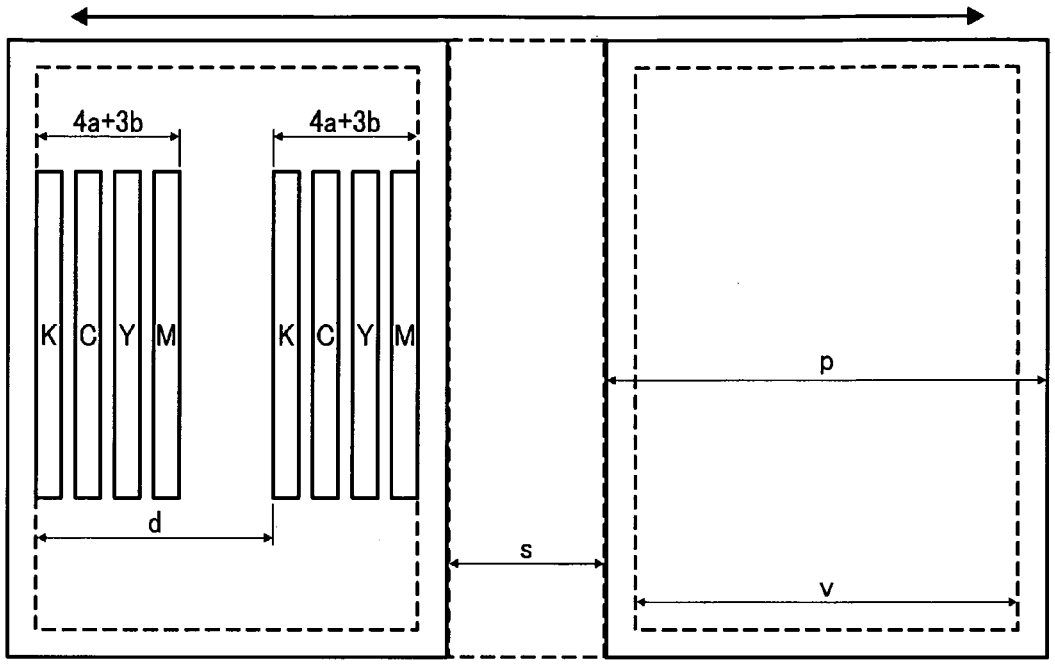
FIG. 11 is a schematic for explaining a procedure of obtaining a layout.

To allow the patch columns of the same color to be arranged at the optimal interval d in the manner illustrated in FIG. 11, the relational equation (4a+3b)+b≤d must be satisfied. If this relationship is not satisfied, the layout obtaining unit 8 checks if the patch columns can be arranged in the order of KCKCYMYM in the manner illustrated in FIG. 12 or KKCCMMYY sequentially from the leading edge along the rotating direction of the photosensitive element.

When the patch columns can be arranged in the order of KCYMKCYM, the layout obtaining unit 8 checks if the patch columns fit in one page using the optimal interval d. To allow the patch columns to fit in one page, the relational equation d+(4a+3b)≤v must be satisfied.

When these two conditions are satisfied, a K patch column, a C patch column, a Y patch column, and an M patch column can be arranged with a space b between these columns sequentially from the leading edge along the rotating direction of the photosensitive element, and another set of a K patch column, a C patch column, a Y patch column, and an M patch column may be arranged in the same order at the interval d from the last K patch column.

In other words, as illustrated in FIG. 3, the patch columns are arranged so that the patch columns of the same color, for example, the K patch column 201 and the K patch column 211 are arranged at the optimal interval d, that is, 80 millimeters.

Figure 12:
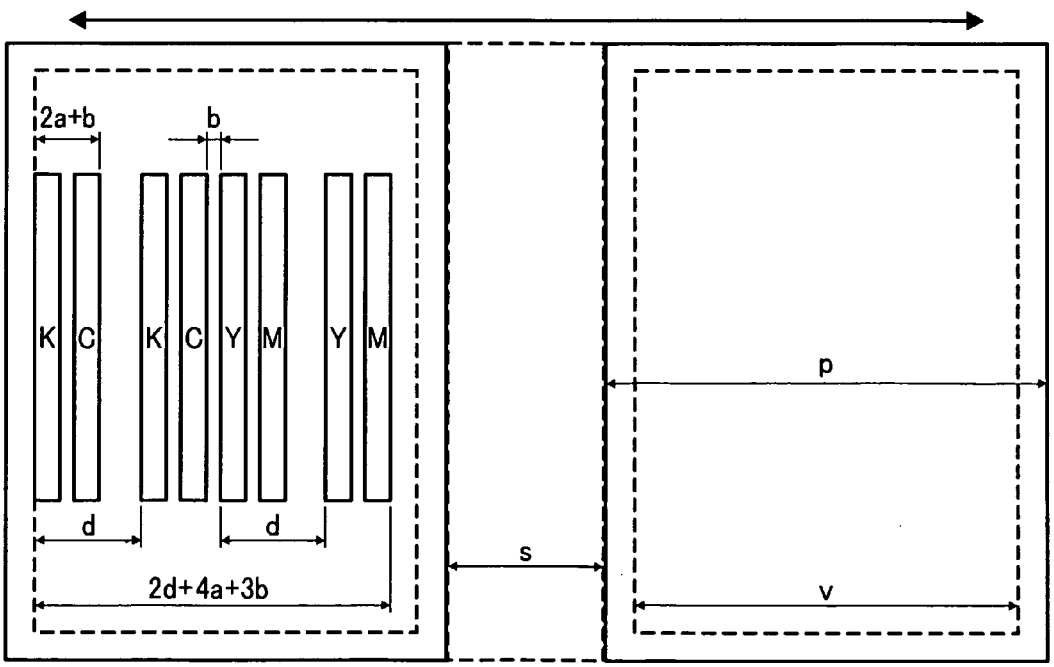
FIG. 12 is another schematic for explaining the procedure of obtaining a layout.

If the patch columns cannot be arranged in the order of KCYMKCYM, but can be arranged in the order of KCKCYMYM, the relationship equation 2d+4a+3b≤v must be satisfied for the patch columns to fit in one page as illustrated in FIG. 12.

A process performed when the patch columns can be arranged in the order of KCYMKCYM but do not fit in one page at the optimal interval d will now be explained. In such a situation, the layout obtaining unit 8 checks if another K patch column can be arranged at a position separated by the distance (2k+1)d from the K patch column on the first page. Where, k is an integer equal to or more than zero. In other words, if there is k that satisfies p+s≤(2k+1)d and (2k+1)d+(4a+3b)≤p+s+v, a layout allowing the patch columns to fit in two pages can be obtained. If the patch columns do not fit in two pages using the optimal interval d, the layout obtaining unit 8 obtains a layout in which the patch columns of the same colors are kept separated as far as possible within a single page.

In the embodiment, the density meter is used in recognizing the density fluctuation on the output result of the pattern illustrated in FIG. 7. However, the scanner may be used instead.

Figure 13:
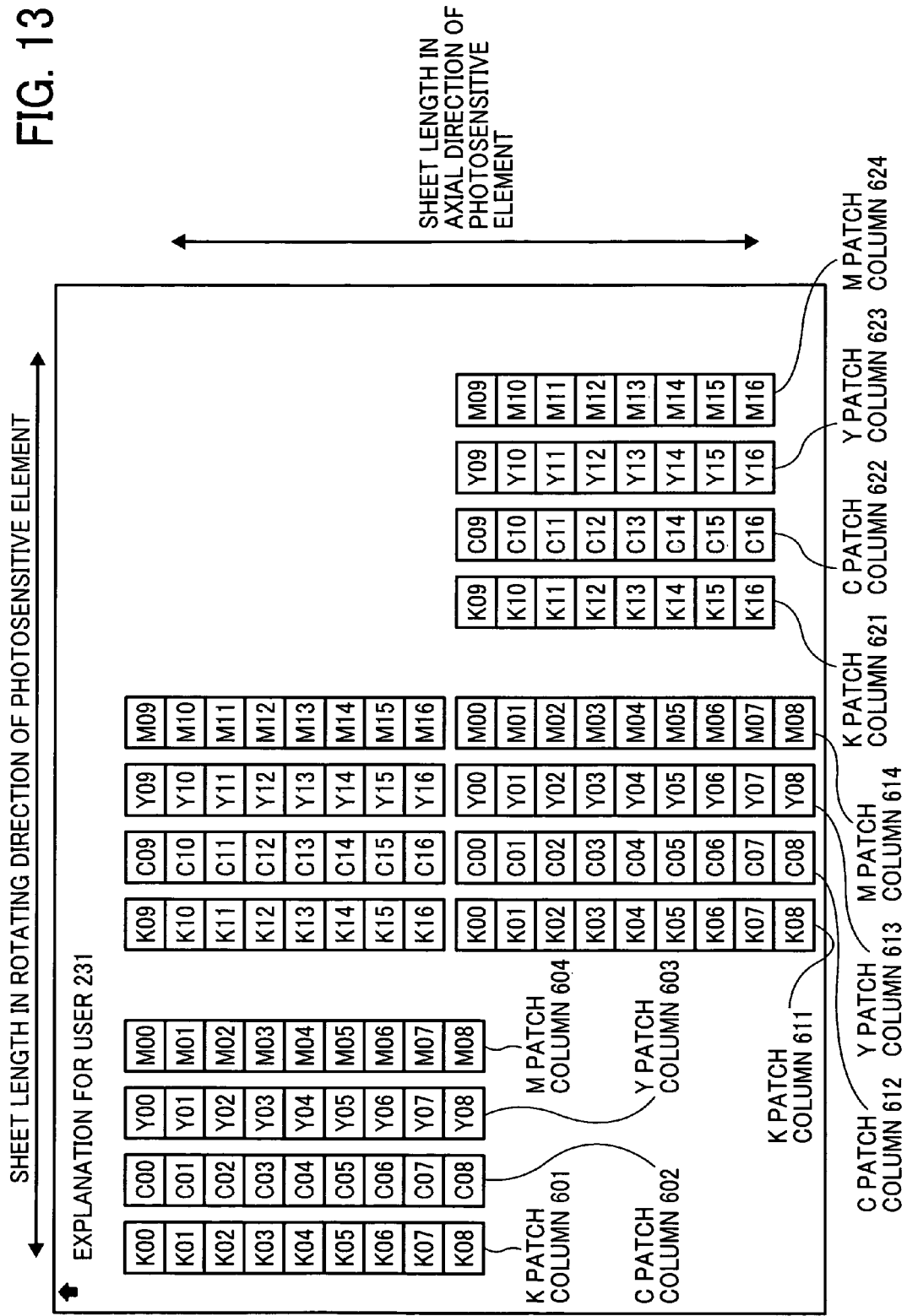
FIG. 13 is a schematic of a patch arrangement (gradation correction parameter generating sheet) when the interval between the pair of main 1-sub 1 and main 3-sub 3 is used as an optimal interval.

When the interval between the pair of the main 1-sub 1 and the main 3-sub 3 is used as the optimal interval, the patches having the same color and the same gradation are arranged at the interval as illustrated in FIG. 13. For example, the patch K00 in the K patch column 601 and the patch K00 in the K patch column 611 are arranged so as to be at an interval of 80 millimeters in the main-scanning direction and at an interval of 80 millimeters in the sub-scanning direction as well.

The present invention may also be realized by supplying a recording medium recording therein a program code of software realizing the functions according to the embodiment to a system or an apparatus, and by causing a computer (central processing unit (CPU) or micro-processing unit (MPU)) for the system or the apparatus to read and execute the program code stored in the recording medium. In such an example, the functions according to the embodiment are realized by the program code itself read from the recording medium. As a recording medium for supplying the program code, a hard disk, an optical disk, a magneto-optical disk, a non-volatile memory card, a read-only memory (ROM), and the like may be used. The present invention includes not only the example in which the computer is caused to read and execute the program code to realize the functions according to the embodiment, but also an example in which an operating system (OS) and the like operating on the computer is caused to execute the entire or some part of the actual processes based on instructions contained in the program code to realize the functions according to the embodiment. Furthermore, the present invention also includes an example in which the program code read from the recording medium is written into a memory included in a function extending board inserted in a computer or a function extending unit connected to the computer, and then a CPU and the like included in the function extending board or the function extending unit is caused to execute the entire or some part of the actual processes based on the instructions contained in the program code to realize the functions according to the embodiment. Furthermore, a computer program for realizing the functions and the like according to the embodiment of the present invention may be provided by a server by means of a communication over a network.

According to the present invention, gradation correction parameters for suppressing the density fluctuation occurring over time and suppressing density fluctuation dependent on the positions of images can be obtained highly precisely.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing apparatus comprising:
an image output unit configured to cause an image output apparatus to output a plurality of gradation correction parameter generating sheets; and
a gradation characteristics obtaining unit configured to obtain gradation characteristics of the image output apparatus based on the plurality of gradation correction parameter generating sheet thus outputs,
wherein the image processing apparatus is configured such that the gradation correction parameter generating sheets includes a plurality of patches having a same color and a same gradation, and the patches are arranged so as to be in a positional relationship that makes a correlation between densities of the patches output by the image output apparatus smallest, and two patches having a same color and a same gradation or a two columns of patches having a same color are arranged at an interval of (2n+1)d, where d is a minimum correlation interval, and n is an integer equal to or more than zero.

2. The image processing apparatus according to claim 1, wherein the image processing apparatus is configured such that, the two patches having a same color and a same gradation or the two columns of patches having a same color are output onto different pages of the plurality of the gradation correction parameter generating sheets, and the two patches or the two columns of the patches are arranged so that an interval between the two patches or the two columns of patches including an inter-paper space used in feeding paper is (2n+1)d.

3. An image processing apparatus comprising:

an image output unit configured to cause an image output apparatus to output a plurality of gradation correction parameter generating sheets; and a gradation characteristics obtaining unit configured to obtain gradation characteristics of the image output apparatus based on the plurality of gradation correction parameter generating sheets thus output, wherein the image processing apparatus is configured such that, the plurality of gradation correction parameter generating sheets includes two patches having a same color and a same gradation, and the two patches are arranged at a minimum correlation interval that is an interval at which a correlation coefficient between densities of the two patches output from the image output apparatus is near a minimum value, and the two patches having a same color and a same gradation or two columns of patches having a same color are arranged at an interval of (2n+1)d, where d is the minimum correlation interval, and n is an integer equal to or more than zero.

4. The image processing apparatus according to claim 3, wherein the image processing apparatus is configured such that, the two patches having a same color and a same gradation or the two columns of patches having a same color are output onto different pages of the plurality of gradation correction parameter generating sheets, and the two patches or the two columns of the patches are arranged so that an interval between the two patches or the two columns of patches including an inter-paper space used in feeding paper is (2n+1)d.

5. An image processing apparatus comprising:

an image output unit configured to cause an image output apparatus to output a plurality of gradation correction parameter generating sheets; and a gradation characteristics obtaining unit configured to obtain gradation characteristics of the image output apparatus based on the gradation correction parameter generating sheets thus output, wherein the image processing apparatus is configured such that, the gradation correction parameter generating sheets includes two patches having a same color and a same gradation, and the two patches are arranged at a minimum correlation interval that is an interval at which a correlation coefficient between densities of the two patches output from the image output apparatus is near a minimum value along a paper conveying direction of the image output apparatus, wherein the two patches having a same color and a same gradation or two columns of patches having a same color are arranged at an interval of (2n+1)d, where d is the minimum correlation interval, and n is an integer equal to or more than zero.

6. The image processing apparatus according to claim 5, wherein the image processing apparatus is configured such that, the two patches having a same color and a same gradation or the two columns of patches having a same color are output onto different pages of the plurality of gradation correction parameter generating sheets, and the two patches or the two columns of the patches are arranged so that an interval between the two patches or the two columns of patches including an inter-paper space used in feeding paper is (2n+1)d.

* * * * *